UNITED STATES PATENT OFFICE.

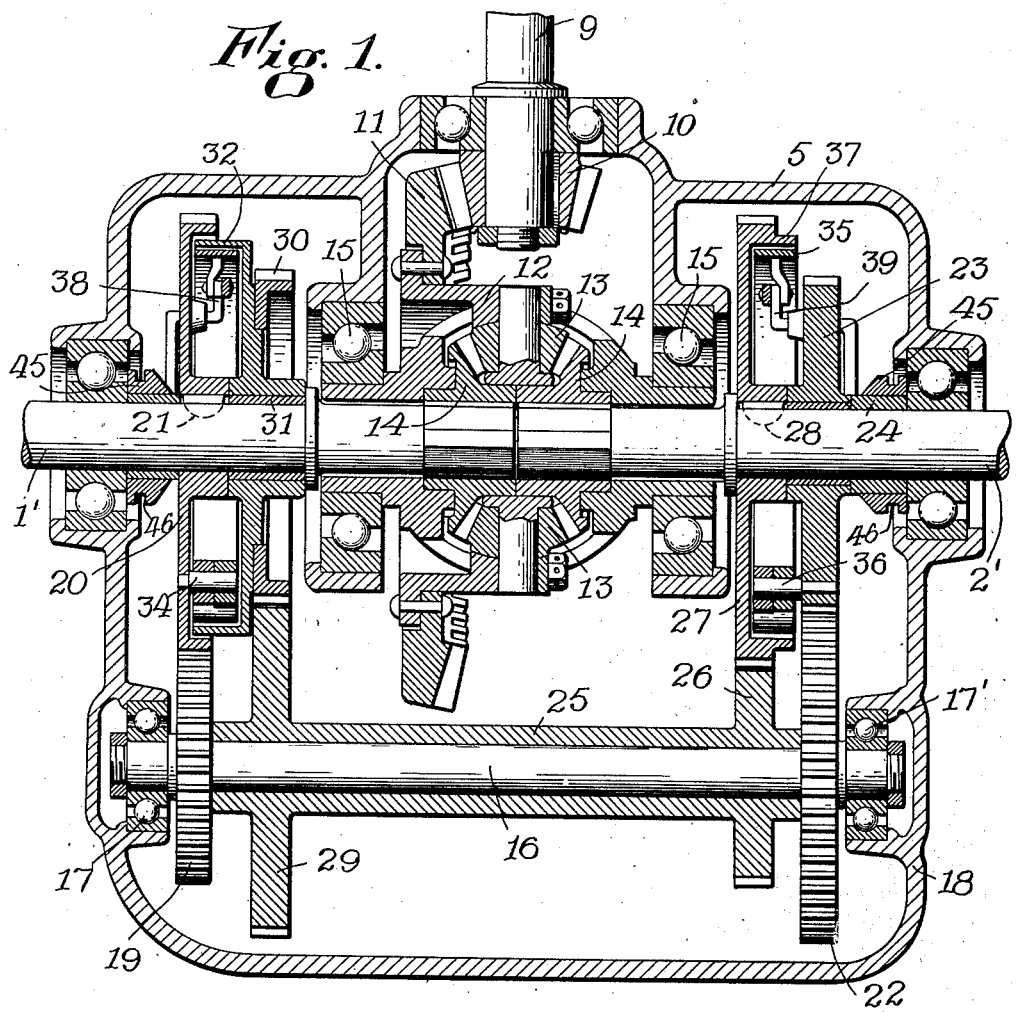
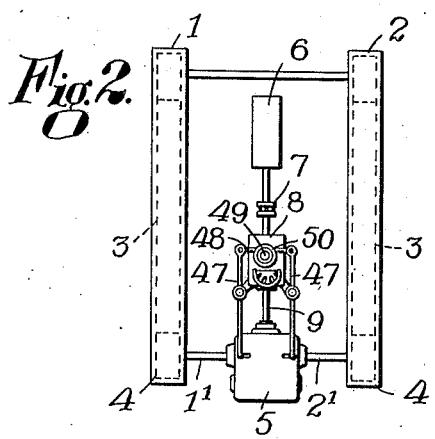
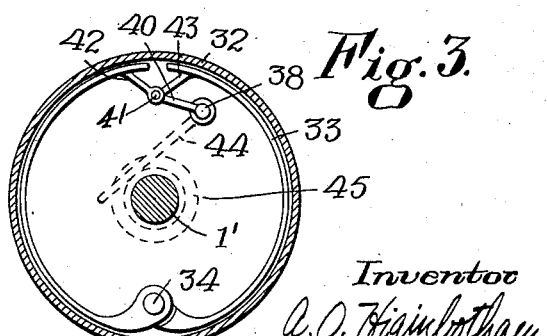

ARTHUR O. HIGINBOTHAM, OF WORCESTER, MASSACHUSETTS, ASSIGNOR TO CHARLES B. FOSTER AND COMPANY, OF WORCESTER, MASSACHUSETTS, A COPARTNERSHIP CONSISTING OF CHARLES B. FOSTER, ARTHUR O. HIGINBOTHAM, AND JEROME R. GEORGE, ALL OF WORCESTER, MASSACHUSETTS.

DRIVING AND STEERING MECHANISM FOR TRACTORS.

1,368,435.   Specification of Letters Patent.   Patented Feb. 15, 1921.

Application filed September 27, 1917. Serial No. 193,567.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Driving and Steering Mechanism for Tractors, of which the following, together with the accompanying drawings, is a specification.

The present invention relates to motor vehicles, and more especially to tractors or the like as used in agricultural work.

In the operation of such machines, particularly tractors of the caterpillar type where the traction members present large and extended surfaces in contact with the ground, great difficulty has been experienced in steering and turning the machines, and in maintaining them in a desired course. In general the use of pilot wheels for steering is unsatisfactory, in that the traction members do not readily and quickly respond thereto. Also, the expedient of braking one traction member to the frame of the machine, while allowing the other to operate at an increased speed through the so-called "differential" gearing, is unsatisfactory in that it involves an excessive waste of power, and furthermore, especially in caterpillar tractors for agricultural work, causes the braked member to dig into the loose earth of the field.

The present invention aims to overcome the disadvantages of the previous methods of steering by a novel combination and arrangement of parts, wherein the driving mechanism itself, as embodied in the so-called differential gearing, is utilized for the steering of the machine. The above and other objects are attained by the construction hereinafter described, reference being had in this connection to the accompanying drawings, in which—

Figure 1 is a sectional view illustrating the mechanism of my invention, as incorporated with an ordinary type of differential gearing.

Fig. 2 is a diagrammatic plan view of a tractor, illustrating the application of my invention thereto.

Fig. 3 is a detail sectional view illustrating the operation of clutching devices which are used in the mechanism of Fig. 1.

Like reference characters refer to like parts in the different figures.

Referring to Fig. 2, the tractor therein shown is provided with the usual elongated traction members 1 and 2, each consisting of suitable endless traction belts 3, 3, whose lower courses are adapted for contact with the ground, whereby the propulsion of the machine is secured. Driving sprockets 4, 4 for said belts are actuated by the respective shafts 1' and 2' of the differential gearing contained in a casing 5, said gearing being connected and driven in the usual manner from a motor 6, by clutch 7, transmission 8 and propeller shaft 9.

The interior of casing 5 is shown in Fig. 1, with the propeller shaft 9 secured to the ordinary driving pinion 10 of the differential gearing, and the shafts 1' and 2' are adapted to be driven thereby in the usual manner. To this end the driving pinion 10 is in mesh with the usual crown gear 11, formed on rotatable member 12, in which the bevel gears 13, 13 are journaled so as to mesh with bevel gears 14, 14, having suitable spline connections with the opposing ends of shafts 1' and 2'. It will be understood that the mechanism above described is typical in all respects of the usual type of differential gearing, which normally transmits the power of the propeller shaft equally to both shafts 1' and 2', but permits the rotation of said shafts at different speeds, as when rounding a curve, without loss of power. The rotatable member 12 is here shown as the usual two-part housing, suitably journaled in the anti-friction bearings 15, 15 which are carried by the casing 5.

The mechanism by which my invention is incorporated with the ordinary differential gearing, as above described, comprises a shaft 16, suitably journaled in bearings 17, 17' of an extension 18 of casing 5. The shaft 16 carries at one end a pinion 19 which meshes with a gear 20 that is keyed or otherwise secured at 21 to the shaft 1'. The pinion 19 and gear 20 establish a definite speed ratio between shaft 1' and shaft 16, as for instance a two to one ratio, whereby the shaft 16 will rotate at twice the speed of the shaft 1'. The shaft 16 carries at its other end a gear 22 which meshes with a gear 23 running loosely on shaft 2', the hub of said gear 23 being preferably journaled on a sleeve 24. The gears 22 and 23 have a definite ratio, in the present instance a one to one ratio, and thus the gear 23 in the present construction may be assumed to rotate, under normal conditions of equal draft on shafts 1' and 2', at twice the speed of said shafts.

An additional shaft is provided for transmitting rotation from a fixed gear on shaft 2' to a loose gear on shaft 1', thus reversing the conditions created by the mechanism above described, and for convenience of construction, this second countershaft 25 is made hollow, and journaled directly on the shaft 16, between the pinion 19 and gear 22. The shaft 25 has an integral pinion 26 which meshes with a gear 27 that is secured to shaft 2' by any suitable means, such as a key 28. The ratio of gear 27 to pinion 26 is the same as the ratio of gear 20 to pinion 19, in the present instance a two to one ratio. A gear 29 on the other end of shaft 25 meshes with a loose gear 30 on shaft 1', the hub of said gear 30 being preferably journaled on a sleeve or bushing 31. The ratio of gear 29 to gear 30 is the same as the ratio of gear 22 to gear 23, in the present instance a one to one ratio.

Means are provided for clutching the adjacent fast and loose gears 20 and 30 respectively, to cause their rotation in unison, and to this end, as here shown, the loose gear 30 has a rim 32 whose interior periphery is adapted for frictional engagement by an expanding and contracting clutching member 33, as shown in Fig. 3. The clutching member 33 is secured by a pin 34 to the fast gear 20, to rotate in unison therewith, and in the normal operation of the tractor, said clutching member is contracted and out of engagement with the rim 32. The same is true of a similar clutching member 35 which is secured by a pin 36 to loose gear 23, and said clutching member is adapted to coöperate, when actuated, with a rim 37 on fast gear 27.

The normally inoperative clutching members 33 and 35 are adapted to be expanded, when desired, into engagement with their respective coöperative surfaces 32 and 37 by means of bell cranks 38, 39 respectively, each of which is pivotally carried by the same gear to which its associated clutching member is secured, namely the gear 20 in one case and the gear 23 in the other. As here shown, these bell cranks extend at their pivotal centers entirely through their supporting gears, and each has an inner arm 40 which is pivotally connected at 41 to the knuckle of a toggle-joint, consisting of links 42 and 43 pivotally attached to the adjacent free ends of each clutching member 33, 35. The outer arm 44 of each bell crank 38, 39 extends downwardly in a different direction to the inner arm 40, with its free end adapted to be acted upon by the surface of a sliding frusto-conical sleeve 45, one of the latter on shaft 1' for coöperation with bell crank 38 and the other on shaft 2' for coöperation with bell crank 39. As will be apparent, the inward movement of each sleeve 45 will rock its associated bell crank in such a manner as to spread the toggle-joint 42, 43 and thereby expand the associated clutching member 33 or 35 into frictional contact with the surface 32 or the surface 37, as the case may be.

Under normal conditions, with the clutching members 33 and 35 inoperative, and the tractor or vehicle moving in a straight path, the operation of the above described mechanism is precisely the same as in ordinary differential gearing, since the loose gears 23 and 30 will rotate simply as idlers on the shafts 2' and 1' respectively, at twice the rate of speed of said shafts. That is to say, all the additional gearing and countershafting, as above described, will have no effect whatsoever on the operation of the mechanism as an ordinary differential or compensating gearing, except when thrown into operation by the clutching members 33 or 35, for the purpose of steering the tractor, as will now be described. The sleeves 45 for operating the clutching members 33 and 35 are each provided with grooves 46 for engagement by suitable shipping devices 47, the latter being connected by rack and pinion 48 and 49 to the steering gear 50 of the tractor, which is adapted for movement in one direction to move one sleeve 45 inward, and in the other direction to move the other sleeve 45 inward, but in normal position to retain both of said sleeves at their outer limits of movement, as shown in Fig. 1, with both clutching members 33 and 35 inoperative. When the clutch 33 is operated, to cause frictional engagement between fast gear 20 and loose gear 30, the shaft 1', being thus connected to said rapidly rotating loose gear, is speeded up, and the shaft 2', by reason of the connection of gear 30 to a slower moving part, is slowed down. This action is transmitted by the ordinary differential or compensating gearing by which the two shafts 1' and 2' are driven from the motor 6. In other words, by the operation of clutching member 33, a braking action is imposed on the shaft 2' to slow the same down, and through the differential gearing, to correspondingly increase the speed of shaft 1'; but this braking action is radically different from that which would ensue if the shaft 2' were braked from the framework or other stationary part of the tractor. In the present instance there is no loss of power whatsoever, since the amount by which the power of shaft 2' is decreased, is added to the power of shaft 1', through the counter shaft 25 and gearing 26, 27, 29 and 30. By this operation, the speed of traction member 1 is increased, with the described ratios of gearing, to twice that of traction member 2, whose speed is correspondingly reduced. The tractor is thus caused, in its forward movement, to turn to the right, Fig. 2, with both sides thereof still traveling forward, but with one side at a higher rate of speed than the other.

The opposite turning movement of the tractor is accomplished by the operation of clutching member 35, to increase the speed of shaft 2' and decrease the speed of shaft 1', through the shaft 16 and gearing 19, 20, 22 and 23. It will be understood that any desired gear ratios may be employed, to vary the difference in speed between the two traction members 1 and 2 in steering. Also it will be obvious that the sleeves 45 can be operated, by the steering gear, so as to cause only a light frictional engagement of their respective clutching members, instead of the full clutching engagement as above described. Under these conditions, the clutching member will be caused to slip on its coöperating engaging surface and, therefore, a lesser amount of power will be taken from the shaft which is being slowed down. As a consequence, the difference in speed between the two shafts will not be so marked as that produced by a full clutching engagement, and this mode of operation may be availed of when only a slight deflection of the tractor is required for steering, or to maintain it in a given course. In any event, there is at all times, by the mechanism above described, a full transmission of all the power of propeller shaft 9 to the two shafts 1' and 2', either equally or unequally divided between said latter shafts. Also, the mechanism renders the tractor instantly responsive to the manipulation of the steering gear, in such a manner that any turning radius, large or small, within the limits of the gearing, can be availed of, while at the same time the continuous forward or backward movement of the tractor is uninterrupted.

I claim:

1. In a machine of the class described, the combination with a "differential" or compensating gearing for the continuous transmission of full driving power to a pair of drive shafts, of gearing operable from each drive shaft independently of said compensating gearing for unequally dividing the power from said compensating gearing between the said two drive shafts, whereby to cause their movement at unequal speeds.

2. In a machine of the class described, the combination with a "differential" or compensating gearing for the continuous transmission of full driving power to a pair of drive shafts, of gearing operable from each drive shaft independently of said compensating gearing for transmiting to one of said drive shafts a portion of the power which is normally delivered by said compensating gearing to the other of said drive shafts, whereby to increase the speed of one drive shaft over that of the other.

3. In mechanism of the class described, the combination with a "differential" or compensating gearing for the continuous delivery of full driving power, normally in equal proportions, to a pair of drive shafts, of a train of gears operable from each shaft for producing rotation at a higher speed than said shaft, and clutching means, operable at will, to connect either shaft with the train of gears from the other shaft.

4. In mechanism of the class described, the combination with a "differential" or compensating gearing for the delivery of power, normally in equal proportions, to a pair of drive shafts, of a member normally running loose on each shaft, means operatively connecting each loose member with the other shaft, for rotation at a higher speed than said shaft, and means, operable at will, to connect either loose member to the shaft on which it runs.

5. The combination with means for normally balancing the full driving torque delivered continuously to a pair of independent drive shafts from a single source of power, of means for upsetting said balance at will, by the establishment of a positive gear connection between said shafts independently of said balancing means, whereby the speed of one is increased and the speed of the other reduced.

6. The combination with a pair of normally independent drive shafts, of a "differential" gearing for normally maintaining a balance in the full driving torque delivered continuously to said shafts, and clutching means for establishing, at will, a positive change speed ratio between said shafts independently of said balancing means.

Dated this seventeenth day of September, 1917.

ARTHUR O. HIGINBOTHAM.

Witnesses:
NELLIE WHALEN,
PENELOPE COMBERBACH.